(12) United States Patent
Moy et al.

(10) Patent No.: US 8,191,537 B1
(45) Date of Patent: Jun. 5, 2012

(54) CRANKCASE VENTILATION SYSTEM WITH VARIABLE BLOWER FOR INCREASED EFFICIENCY

(75) Inventors: Jerald J. Moy, Oregon, WI (US); Scott P. Heckel, Stoughton, WI (US); Christopher E. Holm, Madison, WI (US); Kelly R. Schmitz, Cottage Grove, WI (US); Anthony Barreteau, Quimper (FR)

(73) Assignee: Cummings Filtration IP, Inc., Minneapolis, MN (US)

( * ) Notice: Subject to any disclaimer, the term of this patent is extended or adjusted under 35 U.S.C. 154(b) by 575 days.

(21) Appl. No.: 12/252,851

(22) Filed: Oct. 16, 2008

(51) Int. Cl.
*F02B 25/06* (2006.01)
(52) U.S. Cl. .................. 123/572; 123/573; 123/574
(58) Field of Classification Search .............. 123/572, 123/573, 574
See application file for complete search history.

(56) References Cited

U.S. PATENT DOCUMENTS

| | | | | |
|---|---|---|---|---|
| 5,487,371 | A * | 1/1996 | Beckman et al. | 123/572 |
| 5,562,087 | A * | 10/1996 | Wright | 123/572 |
| 7,014,428 | B2 * | 3/2006 | Pitla et al. | 417/222.2 |
| 7,434,571 | B2 * | 10/2008 | Moncelle et al. | 123/572 |
| 2004/0112346 | A1 * | 6/2004 | Ahlborn et al. | 123/572 |
| 2005/0000496 | A1 * | 1/2005 | Norrick | 123/563 |
| 2007/0089828 | A1 * | 4/2007 | Treier et al. | 156/205 |
| 2007/0144350 | A1 * | 6/2007 | Paling | 96/134 |
| 2007/0215128 | A1 * | 9/2007 | Yonebayashi et al. | 123/572 |
| 2010/0024366 | A1 * | 2/2010 | Hodges et al. | 55/320 |

* cited by examiner

*Primary Examiner* — Marguerite McMahon
*Assistant Examiner* — James Kim
(74) *Attorney, Agent, or Firm* — Andrus, Sceales, Strake & Sawall, LLP

(57) ABSTRACT

A crankcase ventilation system for an internal combustion engine includes a separator and an amplifier increasing at least one of flow and pressure along the flow path through the separator to provide higher separation efficiency.

1 Claim, 3 Drawing Sheets

CRANKCASE VENTILATION SYSTEM WITH VARIABLE BLOWER FOR INCREASED EFFICIENCY

BACKGROUND AND SUMMARY

The invention relates to crankcase ventilation systems for an internal combustion engine.

Crankcase ventilation systems are known for internal combustion engines having a crankcase containing blowby gas and oil aerosol. An internal combustion engine generates blowby gas in a crankcase containing engine oil and oil aerosol. An air/oil separator has an inlet receiving blowby gas and oil aerosol from the crankcase, and an air outlet discharging clean blowby gas to the atmosphere or back to the engine air intake. The separator has a flow path therethrough separating the blowby gas and the oil in the oil aerosol.

The present invention arose during continuing development efforts in the above technology.

DETAILED DESCRIPTION

Figure 1:
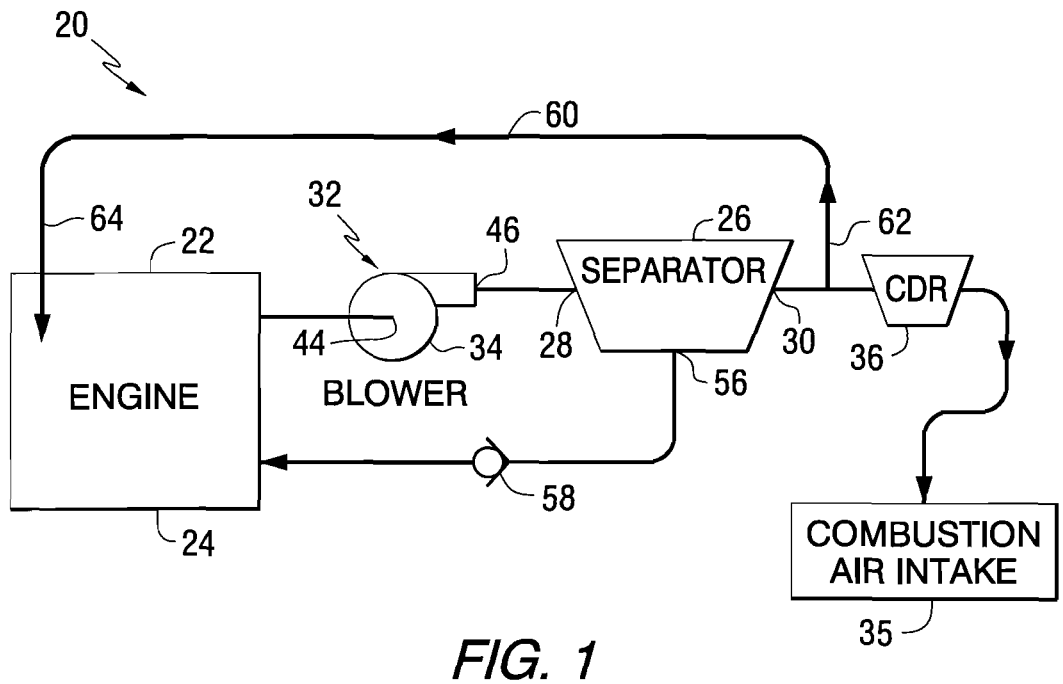
FIG. 1 is a schematic illustration of a crankcase ventilation system in accordance with the invention.

FIG. 1 shows a crankcase ventilation system 20 for an internal combustion engine 22 having a crankcase 24 containing blowby gas and oil aerosol. A separator 26 has an inlet 28 receiving the blowby gas and oil aerosol, and an outlet 30 discharging clean blowby gas. The separator has a flow path therethrough separating the blowby gas and the oil in the oil aerosol. The separator is preferably an inertial impactor or a coalescer, each of which is known in the prior art, though other types of aerosol separation devices may be used, including electrostatic separators, cyclones, axial flow vortex tubes, powered centrifugal separators, motor or turbine-driven cone-stack centrifuges, spiral vane centrifuges, rotating coalescers, and other types of separators known for usage in engine blowby aerosol separation. An amplifier 32 is provided for increasing at least one of flow and pressure along the noted flow path through the separator to provide higher separation efficiency. The increased flow is preferably increased flow velocity and/or increased flow volume. In a preferred embodiment, the amplifier is a blower 34 as shown in FIG. 1. In another embodiment, the amplifier is a Venturi, to be described. In another embodiment, the amplifier is a pump, to be described. In a further embodiment, the amplifier uses compressed air to power the increasing of at least one of flow and pressure. FIG. 1 shows a closed crankcase ventilation, CCV, system wherein the blowby gas from the outlet 30 of the separator is supplied back to the combustion air intake 35 of the engine for example through a crankcase depression regulator, CDR, valve 36.

Figure 2:
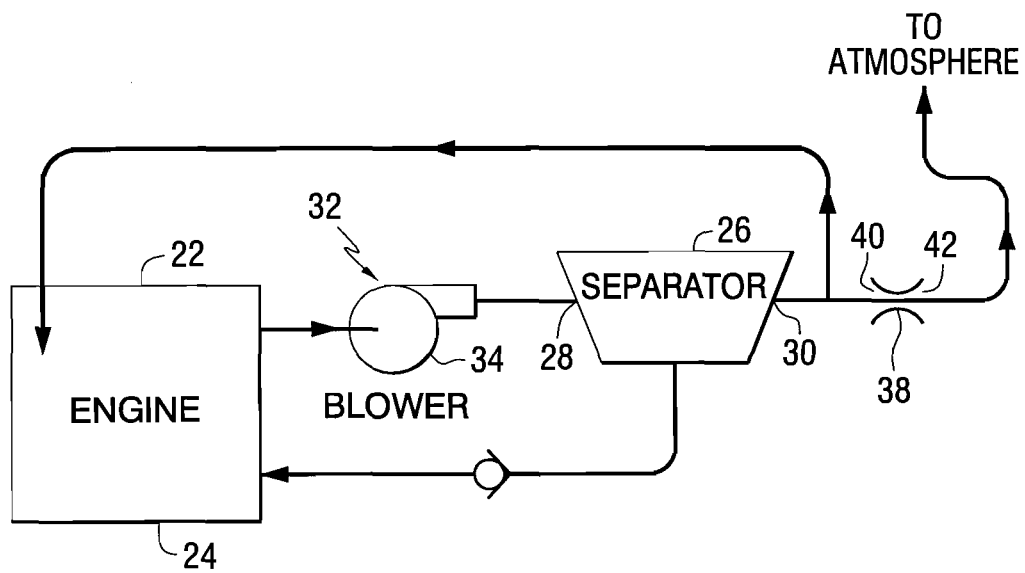
FIG. 2 is like FIG. 1 and shows a further embodiment.

FIG. 2 shows an open crankcase ventilation, OCV, system and uses like reference numerals from FIG. 1 where appropriate to facilitate understanding. The outlet 30 of the separator supplies the clean blowby gas through a restrictor 38 to atmosphere. The restrictor has an upstream side 40 receiving the clean blowby gas from the outlet 30 of the separator, and has a downstream side 42 discharging the blowby gas to atmosphere. Upstream side 40 is at a higher pressure than downstream side 42, due to the restriction, to reduce the possible entry of unfiltered air from downstream side 42 to upstream side 40, to thus protect the remainder of the system upstream therefrom, including engine 22, from such possible entry of unfiltered air.

Amplifier 32, FIG. 1, communicates with one of the inlet 28 and the outlet 30 of the separator 26. Amplifier 32 has an inlet 44 and an amplified outlet 46. In FIG. 1, amplified outlet 46 communicates with inlet 28 of separator 26.

Figure 3:
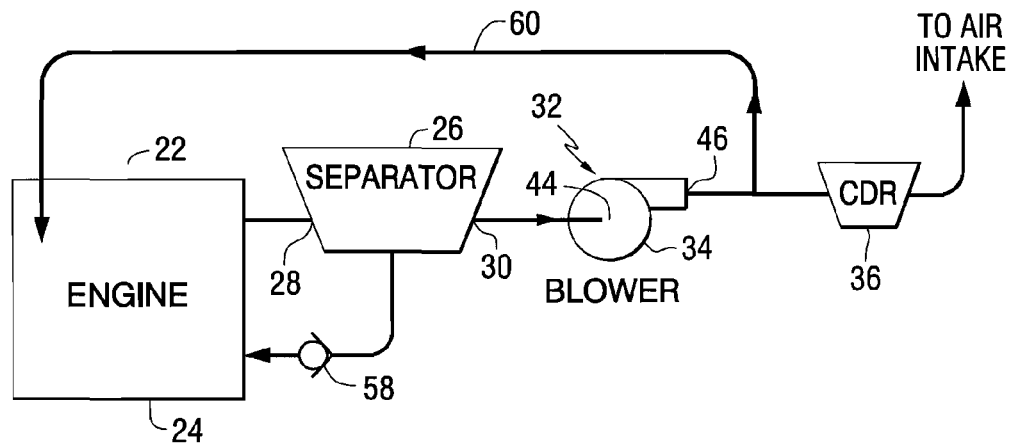
FIG. 3 is like FIG. 1 and shows a further embodiment.

FIG. 3 uses like reference numerals from above where appropriate to facilitate understanding. In FIG. 3, inlet 44 of amplifier 32 communicates with the outlet 30 of the separator 26. In the embodiment of FIG. 3, a blower 34 or a vacuum pump may provide the noted increased flow and/or pressure along the flow path through separator 26 by drawing or suctioning the flow therefrom at outlet 30.

Figure 4:
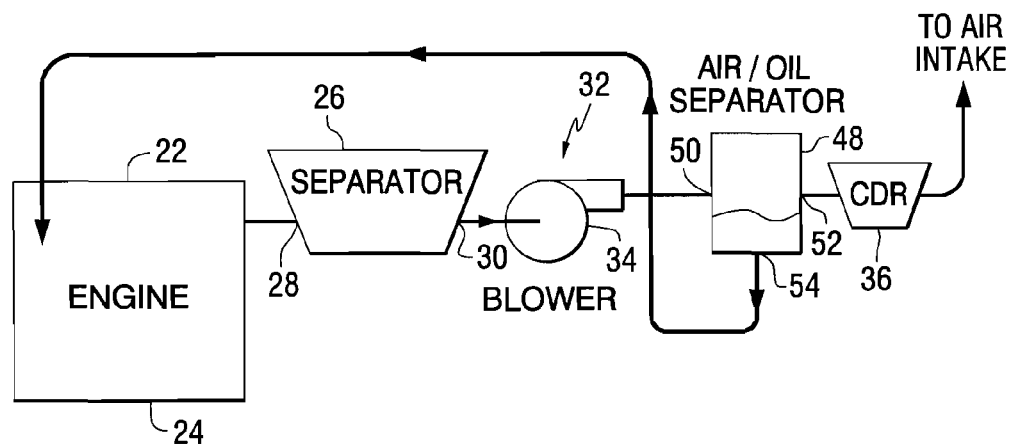
FIG. 4 is like FIG. 1 and shows a further embodiment.

FIG. 4 uses like reference numerals from above where appropriate to facilitate understanding. In FIG. 4, separator 26 is a first separator. A second separator 48 has an inlet 50 communicating with outlet 30 of first separator 26, and has an outlet 52 discharging the clean blowby gas. Second separator 48 has an oil drain 54 draining separated oil back to the engine. In FIG. 4, oil drain 54 of separator 48 is the sole oil drain in the system, eliminating the need for an oil drain in first separator 26. In FIG. 1, separator 26 has an oil drain 56 draining separated oil back to the engine through one-way check valve 58. In FIG. 4, amplifier 32 is between first and second separators 26 and 48, namely between outlet 30 of first separator 26 and inlet 50 of second separator 48. Inlet 50 of second separator 48 communicates with outlet 30 of first separator 26 through amplifier 32. In another embodiment, amplifier 32 may be provided between engine 22 and first separator 26. In the embodiment of FIG. 4, first separator 26 is preferably selected the group consisting of an inertial impactor, a coalescer, and a centrifugal cyclone, and second separator 48 is preferably selected from the group consisting of an inertial impactor, a coalescer, a centrifugal cyclone, and a volume settlor, the latter being depicted in FIG. 4.

In some preferred embodiments, amplifier 32 provides the noted increasing of at least one of flow and pressure by supplying supplemental air flow through separator 26. In one embodiment, the amplifier provides increased flow volume through the separator; and a secondary flow loop 60, FIG. 1, is provided, having an input 62 from the outlet 30 of separator 26 and carrying excess air supplied by amplifier 32 and enabling the noted increased flow volume. In FIG. 1, amplifier 32 is between engine 22 and separator 26, and flow through secondary flow loop 60 is in reverse parallel with flow through amplifier 32 and separator 26. Secondary flow loop 60 has an output 64 supplying excess air to the engine.

Figure 5:
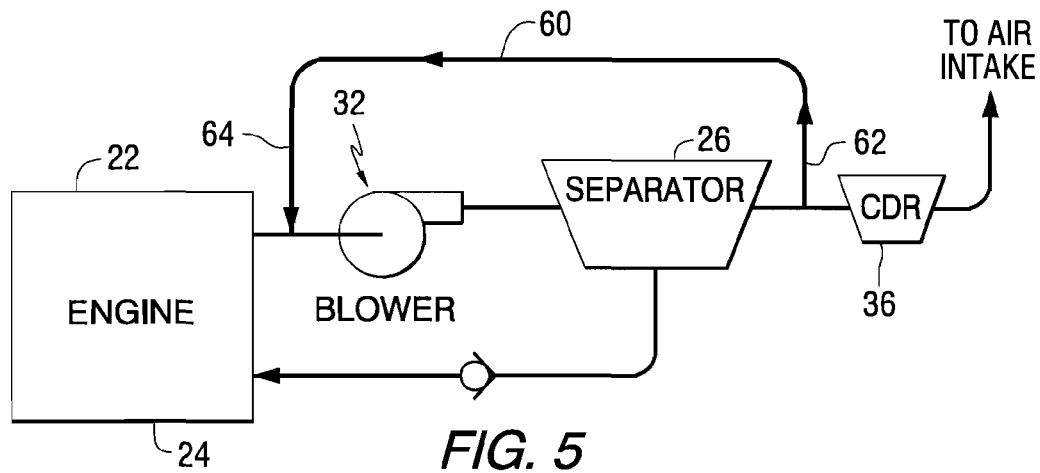
FIG. 5 is like FIG. 1 and shows a further embodiment.

FIG. 5 uses like reference numerals from above where appropriate to facilitate understanding. In FIG. 5, output 64 of secondary flow loop 60 supplies excess air to the inlet of separator 26 preferably through amplifier 32. In FIG. 3, separator 26 is between engine 22 and amplifier 32, and the flow through secondary flow loop 60 is in reverse parallel with flow through separator 26 and amplifier 32.

Figure 6:
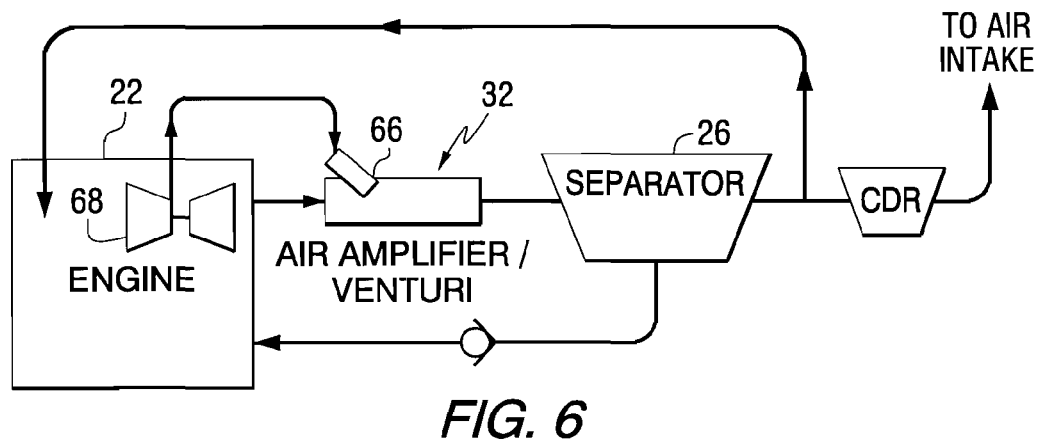
FIG. 6 is like FIG. 1 and shows a further embodiment.

FIG. 6 uses like reference numerals from above where appropriate to facilitate understanding. The noted amplifier is provided by a Venturi 66 which may be driven by an engine turbocharger 68. In other embodiments, the amplifier may be a pump, as above noted, for example a suction pump creating vacuum on the outlet of the separator. In other embodiments, compressed air may be used to power the amplifier such as a blower or a Venturi. In preferred embodiments, the amplifier may have a power source selected from the group consisting of: an electric motor; an oil driven motive member; a compressed air driven motive member; a fuel pressure driven motive member; an engine rotating shaft; an engine driven belt; and a mechanical motor.

Figure 7:
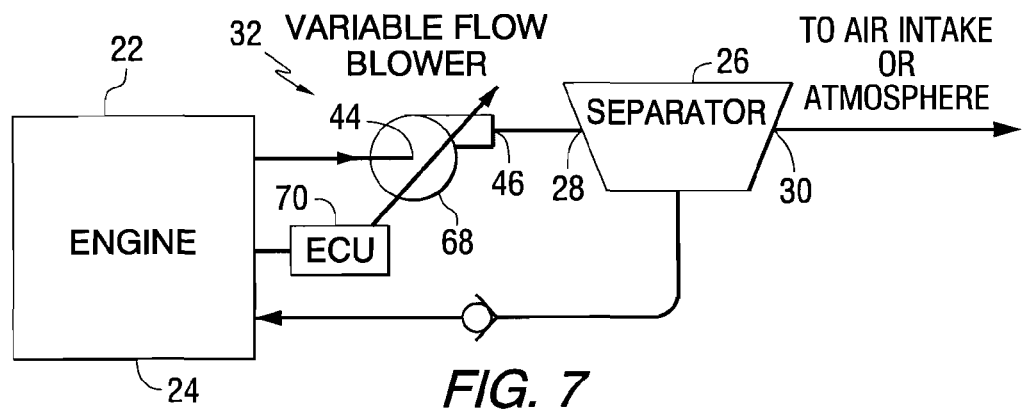
FIG. 7 is like FIG. 1 and shows a further embodiment.

FIG. 7 uses like reference numerals from above where appropriate to facilitate understanding. Amplifier 32 is a variable amplifier 68, e.g. a variable speed blower having an inlet 44 and a variably amplified outlet 46. Variable amplifier 68 increases pressure drop across separator 26 without increased flow volume through the separator, enabling elimination of secondary flow loop 60 from the outlet 30 of the separator to one of engine 22 and inlet 44 of the amplifier. In the preferred embodiment, amplification of variably amplified outlet 46 of variable amplifier 68 increases with decreasing engine load. In one embodiment, a control system, for example the engine ECU, electronic control unit, 70 controls amplification of variably amplified outlet 46 of variable amplifier 68 according to one or more given engine parameters preferably selected from the group consisting of: engine speed; combustion mass air flow; and crankcase pressure.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A crankcase ventilation system for an internal combustion engine having a crankcase containing blowby gas and oil aerosol, a separator having an inlet receiving said blowby gas and oil aerosol, and an outlet discharging blowby gas, said separator having a flow path therethrough separating said blowby gas and oil in said oil aerosol, an amplifier increasing at least one of flow and pressure along said flow path through said separator to provide higher separation efficiency, wherein said amplifier is a variable amplifier, and has an inlet and variably amplified outlet, wherein amplification of said variably amplified outlet increases with decreasing engine load.

* * * * *

UNITED STATES PATENT AND TRADEMARK OFFICE
CERTIFICATE OF CORRECTION

PATENT NO. : 8,191,537 B1
APPLICATION NO. : 12/252851
DATED : June 5, 2012
INVENTOR(S) : Jerald J. Moy et al.

It is certified that error appears in the above-identified patent and that said Letters Patent is hereby corrected as shown below:

On the Title Page:

Item [73] Assignee:

Delete "Cummings Filtration IP, Inc." and substitute therefor --Cummins Filtration IP, Inc.--

Signed and Sealed this
Seventeenth Day of July, 2012

David J. Kappos
*Director of the United States Patent and Trademark Office*